United States Patent
Hall et al.

(10) Patent No.: US 9,645,569 B1
(45) Date of Patent: May 9, 2017

(54) AUTOMATED STORAGE AND RETRIEVAL DIRECT MOVEMENT METHOD

(71) Applicants: David R. Hall, Provo, UT (US);
Joseph Blanch, Provo, UT (US);
Andrew Priddis, Mapleton, UT (US);
Eimi Priddis, Mapleton, UT (US);
Kevin Cheatham, Provo, UT (US)

(72) Inventors: David R. Hall, Provo, UT (US);
Joseph Blanch, Provo, UT (US);
Andrew Priddis, Mapleton, UT (US);
Eimi Priddis, Mapleton, UT (US);
Kevin Cheatham, Provo, UT (US)

( * ) Notice: Subject to any disclaimer, the term of this patent is extended or adjusted under 35 U.S.C. 154(b) by 0 days.

(21) Appl. No.: 15/260,979

(22) Filed: Sep. 9, 2016

(51) Int. Cl.
*G05B 19/19* (2006.01)
*B65G 1/137* (2006.01)
*B65G 1/06* (2006.01)
*B65G 1/127* (2006.01)
*A47B 46/00* (2006.01)
*A47B 63/06* (2006.01)

(52) U.S. Cl.
CPC .......... *G05B 19/19* (2013.01); *A47B 46/005* (2013.01); *A47B 63/067* (2013.01); *B65G 1/06* (2013.01); *B65G 1/127* (2013.01); *B65G 1/137* (2013.01)

(58) Field of Classification Search
CPC .......... B65G 1/06; B65G 1/137; G05B 19/19
See application file for complete search history.

(56) References Cited

U.S. PATENT DOCUMENTS

| | | | | |
|---|---|---|---|---|
| 5,542,641 | A * | 8/1996 | Donovan | A47G 1/1646 248/262 |
| 6,701,678 | B1 * | 3/2004 | Skov | A47F 5/0815 403/326 |
| 6,935,518 | B2 * | 8/2005 | Winig | A47B 96/027 211/106.01 |
| 9,108,360 | B2 * | 8/2015 | Comb | F16H 19/06 |
| 9,151,770 | B2 * | 10/2015 | Reuteler | G01N 35/0099 |
| 9,469,492 | B2 * | 10/2016 | Kashihara | B65G 67/00 |
| 2008/0264304 | A1 * | 10/2008 | Grainger | B65G 1/02 108/51.11 |
| 2015/0014215 | A1 * | 1/2015 | Jacobsson | H05K 13/0084 206/718 |
| 2017/0036859 | A1 * | 2/2017 | Lopes Ribeiro | B65G 1/137 |
| 2017/0036867 | A1 * | 2/2017 | Zhou | B65G 49/067 |
| 2017/0053099 | A1 * | 2/2017 | Coughlin | G06F 19/3462 |

* cited by examiner

*Primary Examiner* — Thomas Randazzo

(57) ABSTRACT

The invention is a method for repositioning objects in an automated storage and retrieval system. The method allows objects to move one at a time in an optimally efficient non-revolving sequence, so that often-used storage items can be retrieved more quickly. The method includes arranging positionable objects, such as storage bins or appliances, within a frame with one or more walls. The objects are attached removably to the walls by connectors, such as hooks. One or more planar motion mechanisms, such as H-bots, are mounted on the walls next to the objects. The planar motion mechanisms lift the objects from the connectors to reposition the objects. When a target object is designated, a microcontroller teaches the planar motion mechanisms a sequence for moving the objects into vacant spaces such that the target object can travel to a target access position by the most direct path.

20 Claims, 17 Drawing Sheets

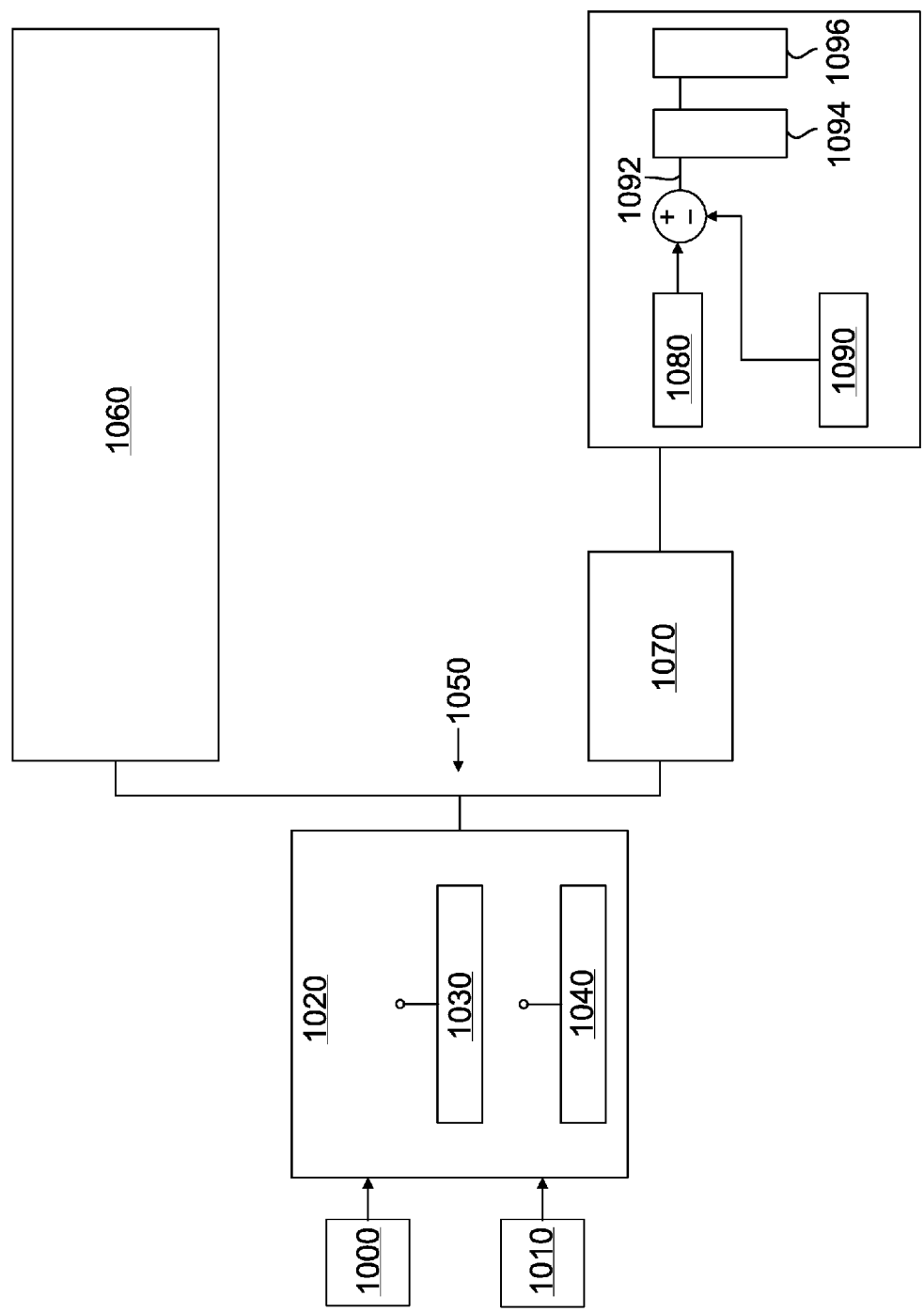

AUTOMATED STORAGE AND RETRIEVAL DIRECT MOVEMENT METHOD

TECHNICAL FIELD

This invention relates generally to the field of storage systems, and more specifically to automated storage and retrieval systems.

BACKGROUND

Homes, offices, warehouses, and other buildings are in constant need of more storage space. Areas within the buildings—closets, cupboards, attics, shelves, and the like—are often set apart for this purpose, but these storage spaces are seldom used efficiently or to full capacity. Even when the spaces are used to full capacity, maintaining order and accessibility presents a further challenge. Accordingly, various storage systems have been designed to improve the efficiency, accessibility, and organization of various storage spaces.

One such storage system design is an automated storage and retrieval system. An automated storage and retrieval system allows a user to select a desired item or set of items and instruct that the items be brought by mechanical means from distant storage areas to a convenient access point. Thus, automated storage and retrieval systems provide a convenient method for locating and accessing goods while utilizing space that would otherwise be difficult to access.

A wide variety of automated storage and retrieval systems exist in the prior art. Larger scale systems—for example, those used in a warehouse setting—use a variety of automated conveyor belt and/or transport vehicle devices to store and retrieve items. In such cases, items are stacked in multiple layers and space is allotted on at least one side of each stack to access and remove an item at any location within the stack. In smaller scale settings, storage and retrieval systems have been designed that rearrange stored items within a stack until a desired item is accessible at a designated access point.

One example of the latter is a revolving carousel. In the carousel, items are rearranged by moving around a circular track, allowing each item to pass through an access point in turn. This requires less space than the larger scale systems described above; however, this design is still not the most efficient given that space must still be allotted on each circular portion of the track to allow items to pass by each other.

An improvement on the revolving carousel optimizes space by moving items only linearly. In such a method, repeatedly moving one item horizontally from either the top or bottom of a stack and then moving all of the items remaining in the stack vertically to fill the vacant space, creates a circular motion, such that a desired box eventually reaches an access point. Certain embodiments utilize tracks and wheels or conveyors for horizontal movement and lifts for vertical movement. While this linear movement method has a smaller space requirement than the carousel, current embodiments still have several disadvantages.

One disadvantage is that each column of items is supported by the bottom item, which requires that each item in the column be able to bear the weight of all items above it. This places structural requirements on each item that increase costs and waste space. Another disadvantage is that the system can only function if it is at full capacity (meaning it has exactly one vacancy). Furthermore, while the system is not limited to only two columns of items, due to the rotational motion and the nature of the actuators that enable it, any additional column could only accommodate two items, one at the top and one at the bottom. Finally, a disadvantage is that an item must pass through the full rotation before it can be accessed, rather than allowing often-used items to maintain positions of easy access, while seldom-used items maintain distant positions.

In light of the foregoing, what is needed is an automated storage and retrieval system that utilizes linear movement, but that improves on these disadvantages. More specifically, what is needed is an automated storage and retrieval system that allows for, and a method for, moving items one at a time in an optimally efficient non-revolving sequence.

SUMMARY OF THE INVENTION

The disclosed invention has been developed in response to the present state of the art and, in particular, in response to the problems and needs in the art that have not yet been fully solved by currently available components and methods. Accordingly, efficient structural components and methods have been developed to allow an automated storage and retrieval system to move objects one at a time in an optimally efficient non-revolving sequence.

Consistent with the foregoing, a method for repositioning objects in an automated storage and retrieval system is disclosed. The method comprises arranging one or more positionable objects planarly within a frame, the frame comprising one or more walls; removably attaching the one or more positionable objects to one or more connectors that are mounted to the one or more walls; movably mounting one or more planar motion mechanisms to the frame adjacent to the one or more positionable objects; suspending the one or more positionable objects from the one or more connectors by means of the one or more planar motion mechanisms to reposition the one or more positionable objects within the frame; designating a target positionable object; and providing a microcontroller that instructs the one or more planar motion mechanisms to reposition the one or more positionable objects in a sequence of moves comprising at least one vacant space, such that the target positionable object moves directly to a target access position.

In one embodiment, space within the frame is divided into one or more columns of positions, each position comprising one positionable object or one vacant space. In one embodiment, each position has an identifying indicium. In one embodiment, each positionable object has an identifying indicium, which can be a machine reader indicium. In one embodiment, the microcontroller stores a location of each of the one or more positionable objects and each vacant space in non-volatile memory. In one embodiment, the target positionable object moves horizontally or vertically up if located below the target access position, and the target positionable object moves horizontally or vertically down if located above the target access position. In one embodiment, a space between the one or more positionable objects on each side measures approximately one-half inch.

In certain embodiments, the one or more positionable objects comprise storage bins or appliances, the one or more planar motion mechanisms comprise H-bots, and the one or more connectors comprise hooks, which in some embodiments comprise electrical conductors. In one embodiment, the one or more planar motion mechanisms comprise one or more end effectors, which removably attach to the one or more positionable objects, the microcontroller directing their movement. Some embodiments further comprise one or more access ports or a user interface, which, in some embodiments, is a voice control user interface. In some embodiments, a user can use the user interface to assign customizable identifying indicia to the one or more positionable objects, to designate the target positionable object, and to designate a location of the target access position.

BRIEF DESCRIPTION OF THE DRAWINGS

A more particular description of the invention briefly described above is made below by reference to specific embodiments depicted in drawings included with this application, in which:

FIG. 10 depicts one embodiment of instructions that a microcontroller uses to instruct the one or more planar motion mechanisms to reposition the one or more positionable objects in a sequence of moves comprising at least one vacant space, such that the target positionable object moves directly to a target access position;

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
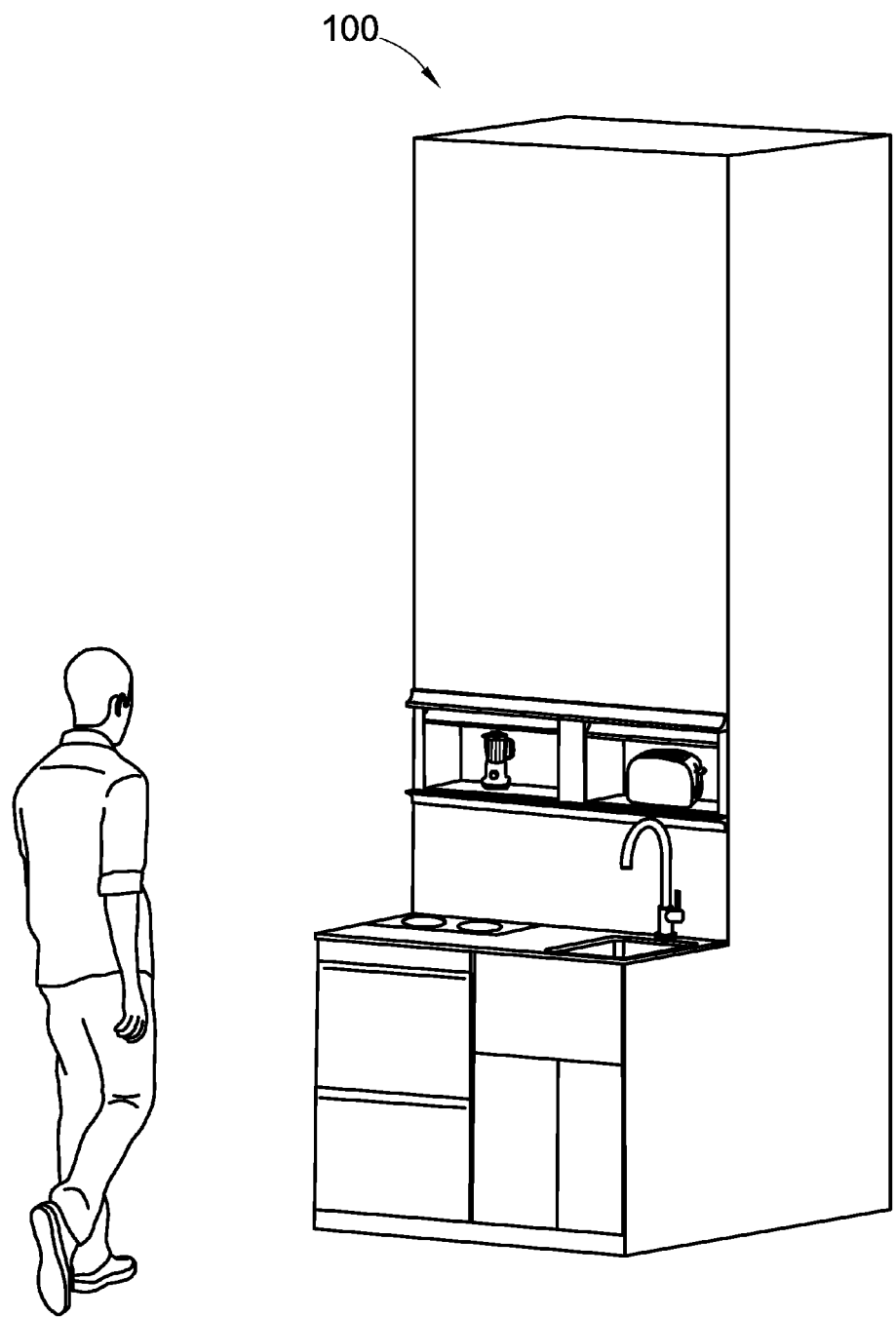
FIG. 1 depicts an exterior view of one embodiment of an automated storage and retrieval system designed according to the invented method for repositioning objects in an automated storage and retrieval system.

FIG. 1 depicts the exterior of one embodiment of an automated storage and retrieval system 100 designed according to the invented method for repositioning objects in an automated storage and retrieval system. The automated storage and retrieval system 100 can be useful for many applications, including for storing appliances in a kitchen, as depicted in FIG. 1.

Figure 2:
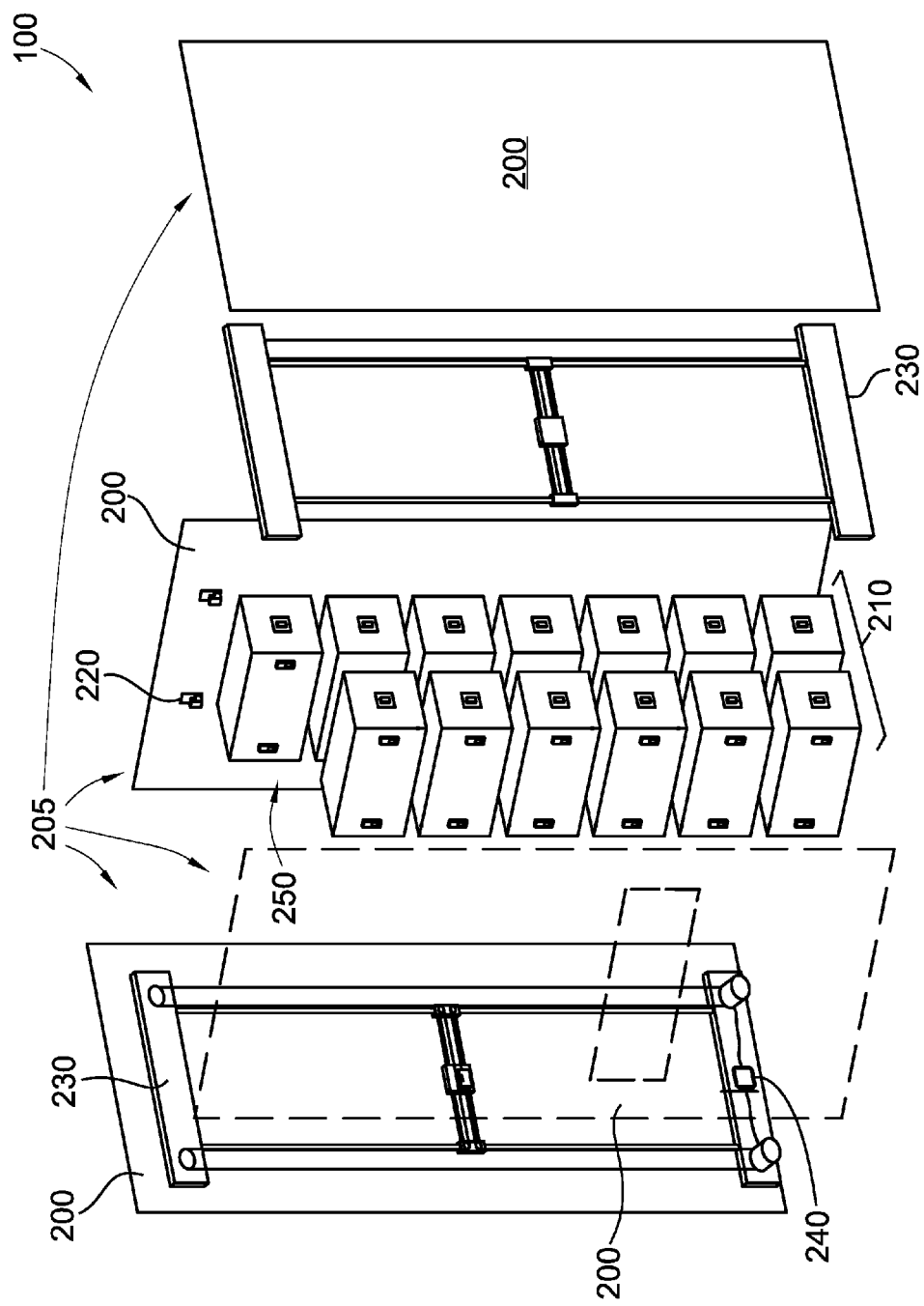
FIG. 2 depicts an exploded interior view of one embodiment of an automated storage and retrieval system designed according to the invented method for repositioning objects in an automated storage and retrieval system.

FIG. 2 depicts an exploded interior view of one embodiment of an automated storage and retrieval system 100 designed according to the invented method for repositioning objects in an automated storage and retrieval system. The method comprises arranging one or more positionable objects 210 planarly within a frame 205, the frame 205 comprising one or more walls 200; removably attaching the one or more positionable objects 210 to one or more connectors 220 that are mounted to the one or more walls 200; movably mounting one or more planar motion mechanisms 230 to the frame 205 adjacent to the one or more positionable objects 210; suspending the one or more positionable objects 210 from the one or more connectors 220 by means of the one or more planar motion mechanisms 230 to reposition the one or more positionable objects 210 within the frame 205; designating a target positionable object; and providing a microcontroller 240 that instructs the one or more planar motion mechanisms 230 to reposition the one or more positionable objects 210 in a sequence of moves comprising at least one vacant space 250, such that the target positionable object moves directly to a target access position.

Figure 3A:
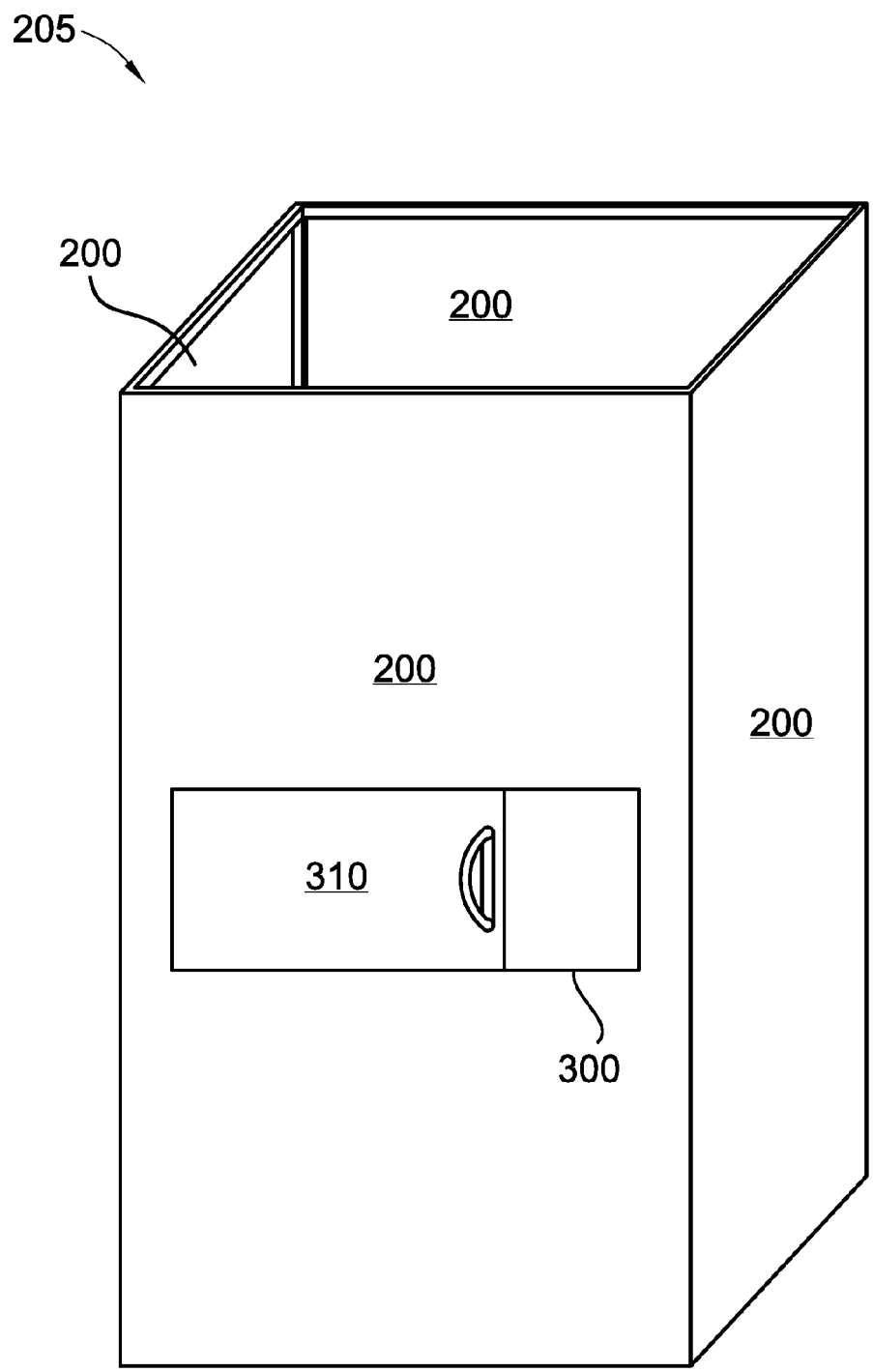
FIG. 3A depicts one embodiment of a frame.

FIG. 3A depicts one embodiment of a frame 205. The frame 205 comprises one or more walls 200. In a preferred embodiment, the frame 205 comprises a rectangular prismatic configuration. The height, length, and width measurements of the frame 205 are variable, corresponding to the number and size of the positionable objects 210 within. In one embodiment, the frame 205 further comprises one or more access ports 300. Each access port 300 comprises a window that provides access to only one of the one or more positionable objects 210. In a preferred embodiment, the one or more access ports 300 each align with a target access position. In one embodiment, each access port 300 is located in a middle portion of the one or more walls 200. In a preferred embodiment, the location of each access port 300 is designatable and movable. FIG. 3A depicts one embodiment of frame 205 with one access port 300. Another embodiment of frame 205 comprises two access ports 300.

Other embodiments comprise more than two access ports 300. These embodiments can correspond with arrangements of the one or more positionable objects 210 in more than two columns inside the frame or can provide access from multiple positions or from the front and back. In one embodiment, each access port 300 comprises a removable covering 310, the removable covering 310 comprising one of a group consisting of a flap that opens from the top or the bottom, a sliding panel, a curtain, or a blind. In one embodiment, the removable covering 310 is mechanically driven. In one embodiment, the frame 205 comprises steel. In another embodiment, the frame 205 comprises a lightweight metal, such as aluminum, magnesium, titanium, beryllium alloys, or combinations thereof. In still other embodiments, the frame 205 comprises OSB, reinforced OSB, lightweight OSB, or other engineered materials, such as engineered wood, composite board, particle board, press board, plywood, wood laminate, chip board, gypsum board, cement board, carbon fiber materials, or combinations thereof. In still other embodiments, the frame 205 comprises plastic, or an optically transparent or a semi-optically transparent material.

Figure 3B:
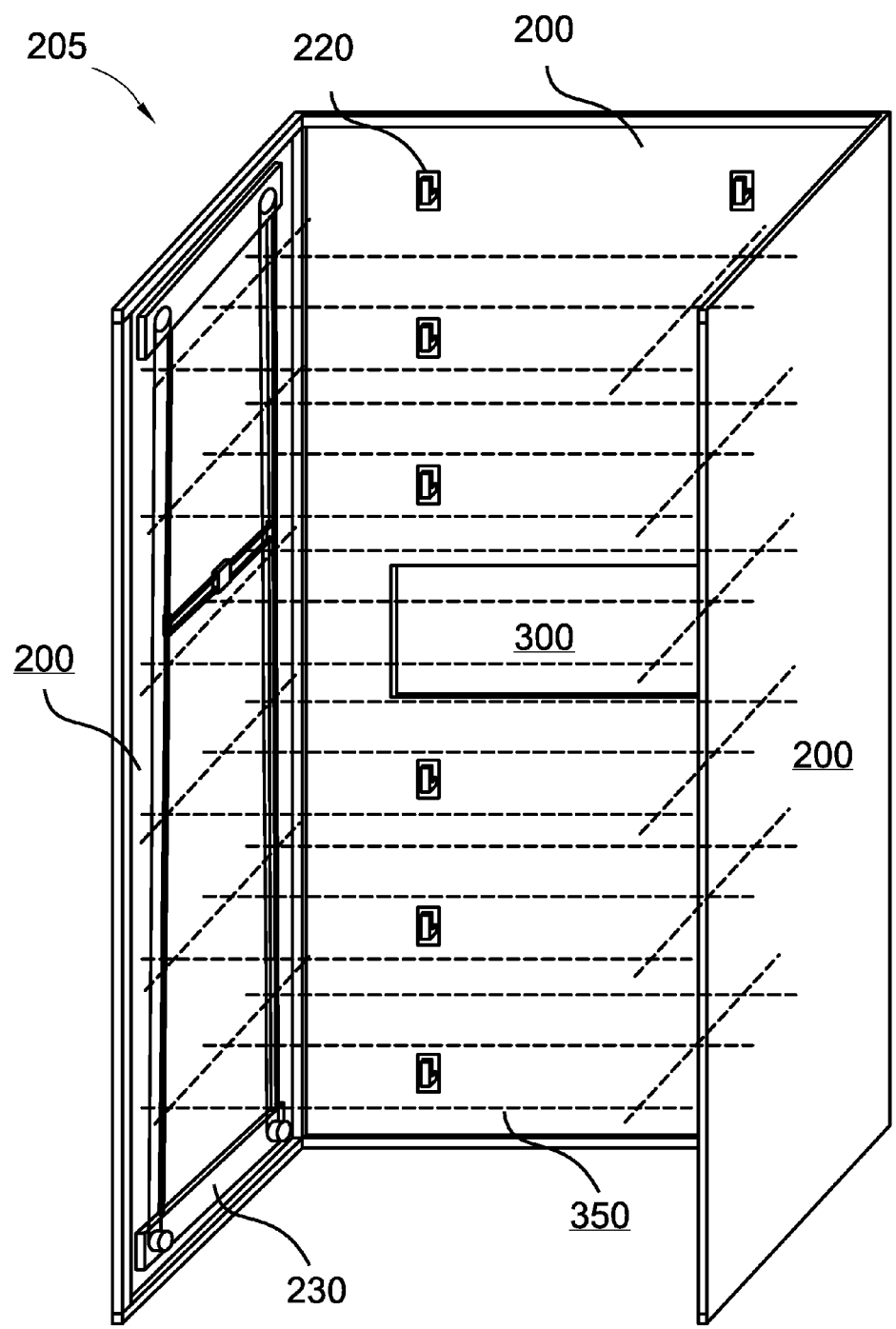
FIG. 3B depicts one embodiment of a frame with the one or more connectors mounted to the one or more walls of the frame, with the one or more planar motion mechanisms movably mounted to the frame, and with a grid outline of two columns of positions.

FIG. 3B depicts one embodiment of a frame 205 with the one or more connectors 220 mounted to the one or more walls 200 of the frame 205 and with the one or more planar motion mechanisms 230 movably mounted to the frame 205. In a preferred embodiment, the one or more connectors 220 are mounted on two opposite walls 200 of the frame 205. (One of the two opposite walls is not depicted in FIG. 3B such that the interior of the frame 205 is visible.) In a preferred embodiment, at least one of the two opposite walls 200 comprise at least one access port 300. In a preferred embodiment, the two opposite walls 200 where the one or more connectors 220 are mounted are adjacent to walls 200 where the one or more planar motion mechanisms 230 are mounted. Because the one or more positionable objects 210 are removably attached to the one or more connectors 220, the number of connectors 220 depends on the desired numerical capacity for the one or more positionable objects 210. In a preferred embodiment, each positionable object 210 is removably attached to two connectors 220, the two connectors 220 being spaced horizontally such that the two connectors 220 can support the weight of one positionable object 210. In one embodiment, two connectors 220 are strong enough to support twenty pounds of weight. In other embodiments, each positionable object 210 is removably attached to one or more than two connectors 220. In one embodiment, the one or more connectors 220 are spaced vertically such that a space between the one or more positionable objects 210 measures approximately one-half inch. The one or more connectors 220 are aligned such that the positionable objects 210 are also aligned in straight vertical columns. The one or more planar motion mechanisms 230 are movably mounted to the frame 205 adjacent to the one or more positionable objects 210 (the one or more positionable objects 210 are not depicted in FIG. 3B). In one embodiment, the one or more planar motion mechanisms 230 extend the entire length of the frame 205. In one embodiment, two planar motion mechanisms 230 are mounted on two opposite walls 200 of the frame 205 (one of the walls is not depicted in FIG. 3B such that the interior of the frame 205 is visible). In this embodiment, the two planar motion mechanisms 230 are mounted on two opposite walls 200 that are adjacent to the walls 200 on which the one or more connectors 220 are mounted. In this embodiment, the two planar motion mechanisms 230 mirror each other's movement to work together to suspend and reposition the one or more positionable objects 210. Another embodiment comprises four planar motion mechanisms 230. In one such embodiment, two planar motion mechanisms 230 are mounted on two opposite walls 200 of the frame 205, which opposite walls 200 are adjacent to the walls 200 on which the one or more connectors 220 are mounted. Two more planar motion mechanisms 230 are positioned back to back in the middle of the frame 205, mounted to walls 200 at the top and the bottom of the frame 205 to hold them upright and in place. Other embodiments comprise one, three, or more than four planar motion mechanisms 230. In one embodiment, space within the frame 205 is divided into one or more columns of positions, each position comprising one positionable object 210 or one vacant space 250. FIG. 3B depicts a grid outline 350 of the positions. Each position is defined by the placement of connectors 220 on the one or more walls 200.

Figure 4:
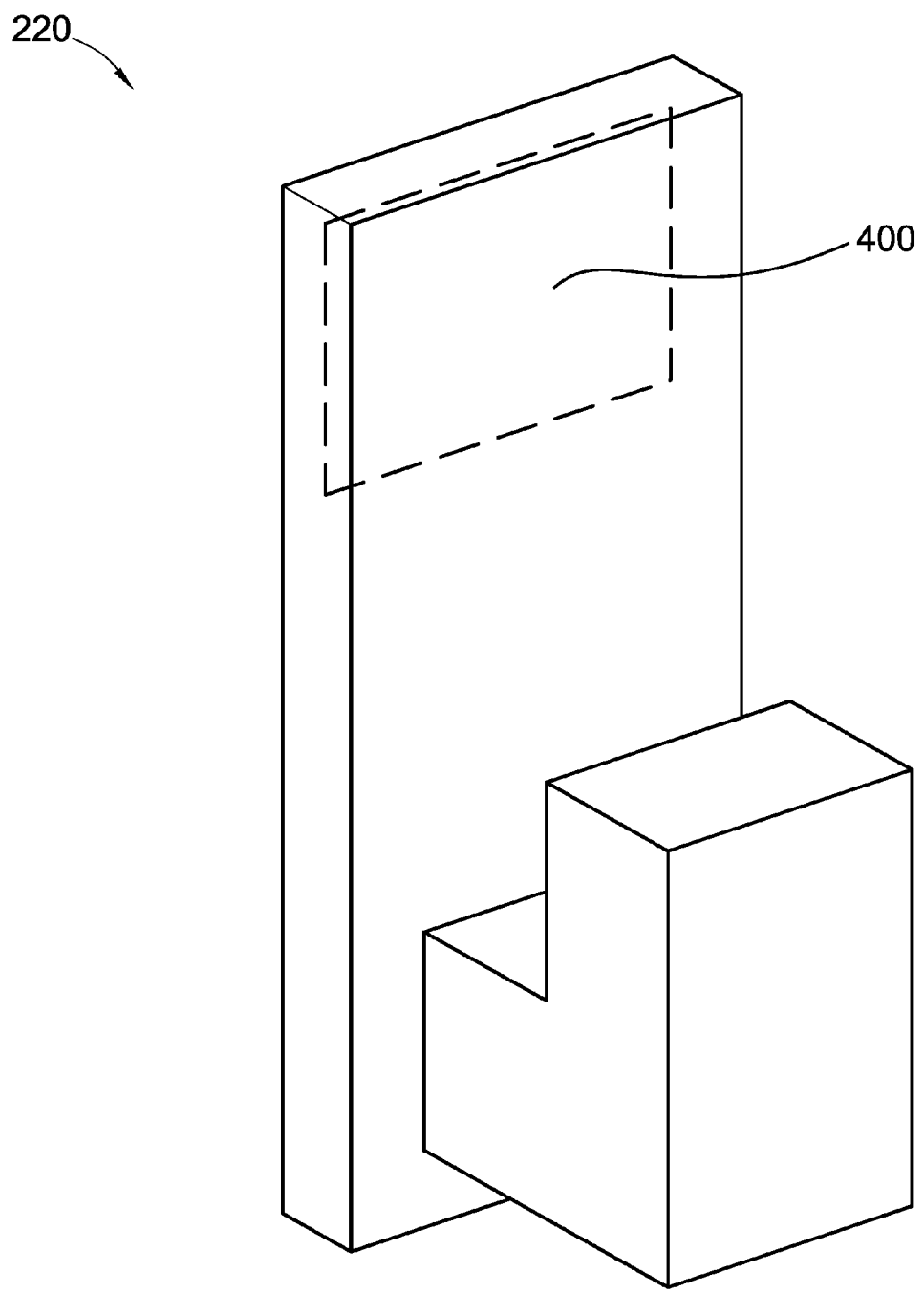
FIG. 4 depicts one embodiment of one of the one or more connectors.

FIG. 4 depicts one embodiment of one of the one or more connectors 220. The claimed method for repositioning objects in an automated storage and retrieval system comprises removably attaching the one or more positionable objects 210 to one or more connectors 220 mounted to the one or more walls 200 of the frame 205. In a preferred embodiment, the one or more connectors 220 comprise hooks. In another embodiment, the one or more connectors 220 comprise magnets. In still other embodiments, the connectors 220 comprise Velcro, adhesives, solenoids, duct tape, or other materials. It is important that the one or more connectors 220 be designed in such a way that a connection can be easily created and also easily removed, such that the one or more positionable objects 210 are removably attached. In one embodiment, the connectors 220 comprise electrical conductors 400. The electrical conductors 400 allow electrical appliances that hang from the connectors 220 to connect directly to power sources through the connectors 220.

Figure 5A:
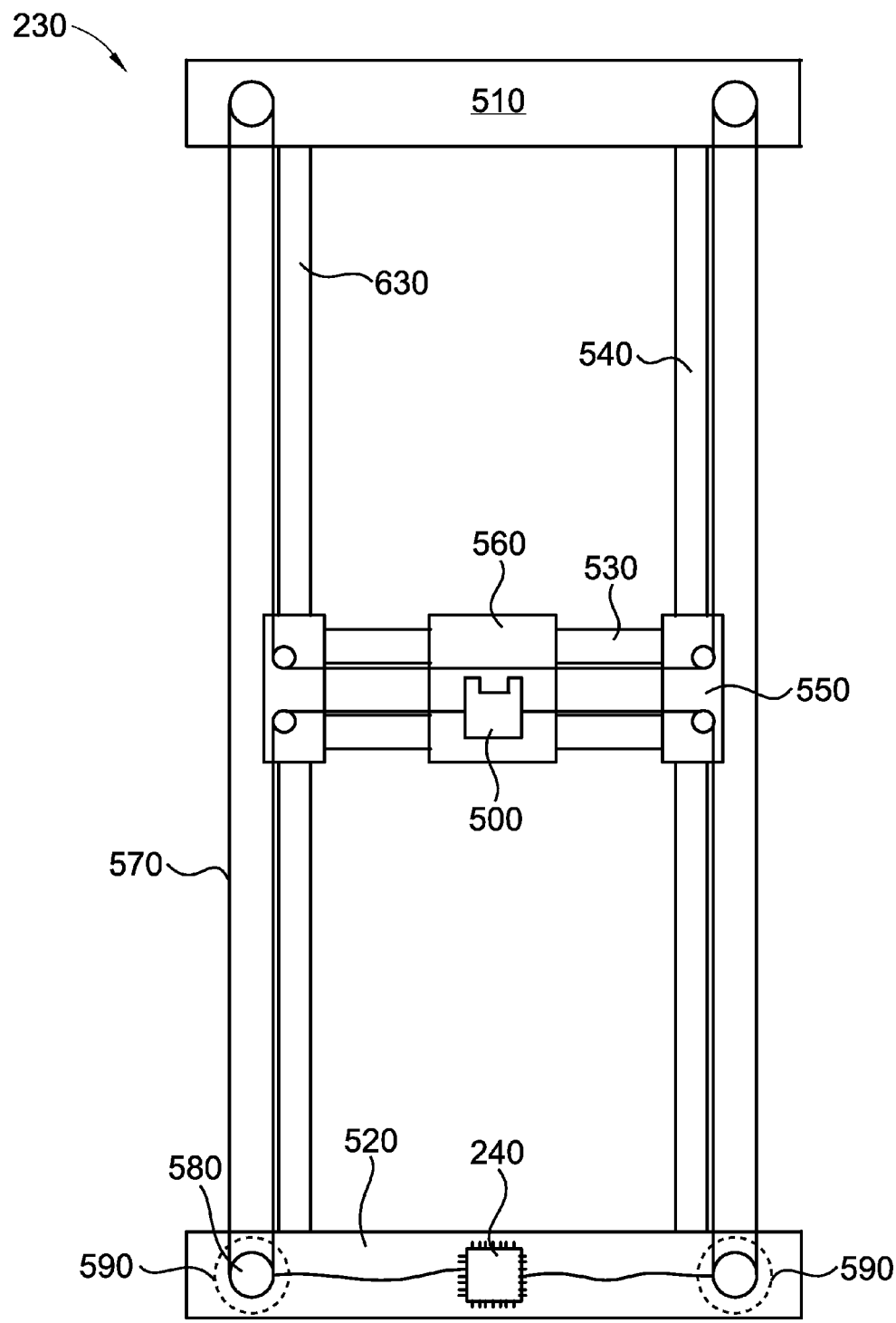
FIG. 5A depicts one embodiment of a planar motion mechanism.

FIG. 5A depicts one embodiment of a planar motion mechanism 230. The method for repositioning objects in an automated storage and retrieval system comprises movably mounting one or more planar motion mechanisms 230 to the frame 205 adjacent to the one or more positionable objects 210. The one or more planar motion mechanisms 230 suspend the one or more positionable objects 210 from the one or more connectors 220 to reposition the one or more positionable objects 210 within the frame 205. A planar motion mechanism, as described in the present invention, is a mechanism capable of movement in two dimensions, the movement in each of the two dimensions being controlled by at least one actuator. In a preferred embodiment, the one or more planar motion mechanisms 230 comprise H-bots. One advantage of an H-bot over other planar motion mechanisms is the feature that the actuators (the motors) remain stationary, which decreases the mass of the moving parts, allowing for faster movement and direction changes, and decreasing space requirements for the system. In a preferred embodiment, the invention comprises two planar motion mechanisms 230. In another embodiment, the invention comprises four planar motion mechanisms 230. Other embodiments comprise one, three, or more than four planar motion mechanisms 230. In one embodiment, the one or more planar motion mechanisms 230 comprise one or more end effectors 500, which removably attach to the one or more positionable objects 210. The microcontroller 240 directs the movement of the one or more end effectors 500. In one embodiment, the one or more planar motion mechanisms 230 comprise an upper support 510, a lower support 520, horizontal tracks 530, vertical tracks 540, a vertical slide table 550, a horizontal slide table 560, an end effector 500, belts 570, pulleys 580, two electric motors 590, and a microcontroller 240. The vertical slide table 550 moves up and down vertically along the vertical tracks 540. The horizontal slide table 560 moves back and forth horizontally along the horizontal tracks 530. The end effector 500 is fixed to the horizontal slide table 560, which allows the end effector 500 to have two degrees of freedom—vertically along the vertical tracks 540 and horizontally along the horizontal tracks 530. The motors 590 drive the belts 570 through a series of pulleys 580, the belts 570 being coupled to the end effector 500. Each motor 590 is capable of applying both a positive and a reverse torque, and a combination of the torque from the two motors 590 moves the end effector 500 through the two dimensions. The microcontroller 240 provides instructions to the motors 590 as to the magnitude and direction of the torque provided. In one embodiment, a battery system powers the motors 590 in the event that there is a power outage.

Figure 5B:
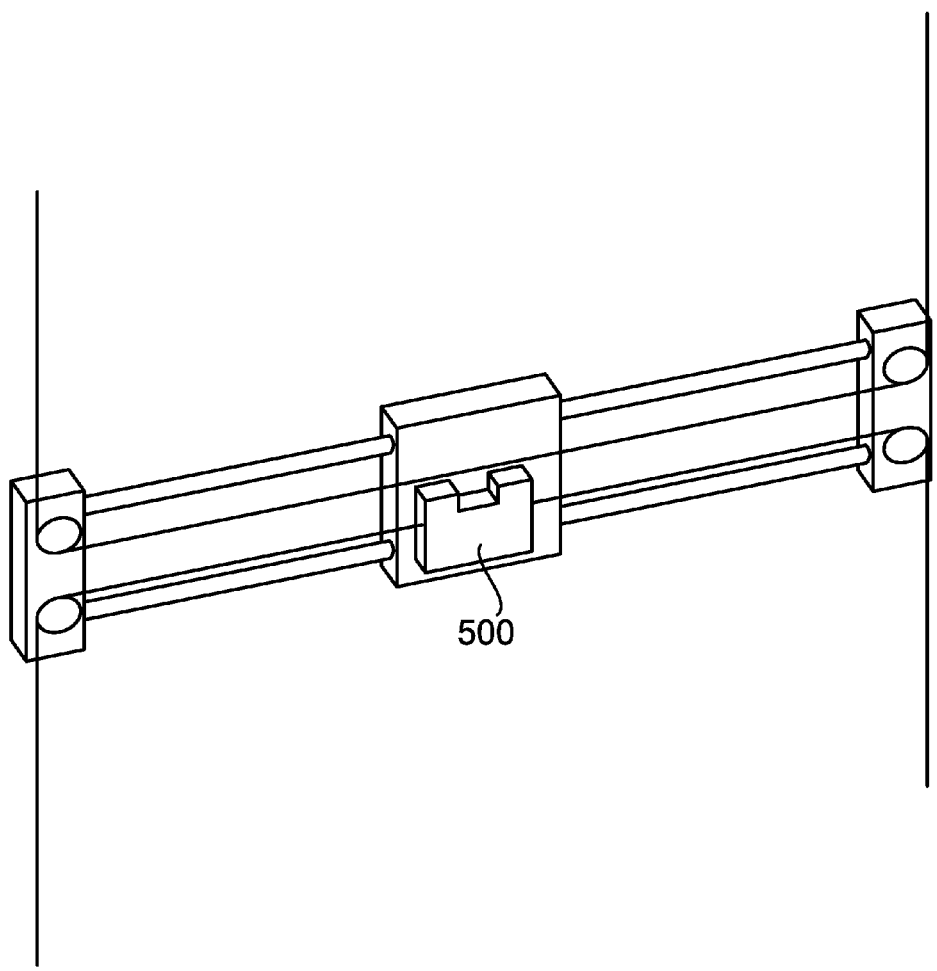
FIG. 5B depicts one embodiment of an end effector of a planar motion mechanism.

FIG. 5B depicts one embodiment of an end effector 500 of a planar motion mechanism 230. In one embodiment, the one or more planar motion mechanisms 230 comprise one or more end effectors 500. The one or more end effectors 500 removably attach to the one or more positionable objects 210, and the microcontroller 240 directs the movement of the one or more end effectors 500. In one embodiment, the one or more end effectors 500 include a slot that mates with a key attached to the one or more positionable objects 210. When the slot mates with the key, the one or more planar motion mechanisms 230 are able to lift, suspend, and reposition the one or more positionable objects 210. In other embodiments, the end effector 500 is any of a variety of connecting mechanisms. In one embodiment, the end effector 500 is a platform that lifts the one or more positionable objects 210 from below. In another embodiment, the end effector 500 is a magnetic attachment. In another embodiment, the end effector 500 has moveable parts, such as finger-like members, and attaches to each positionable object 210 in a manner similar to a hand grasping an item.

Figure 6:
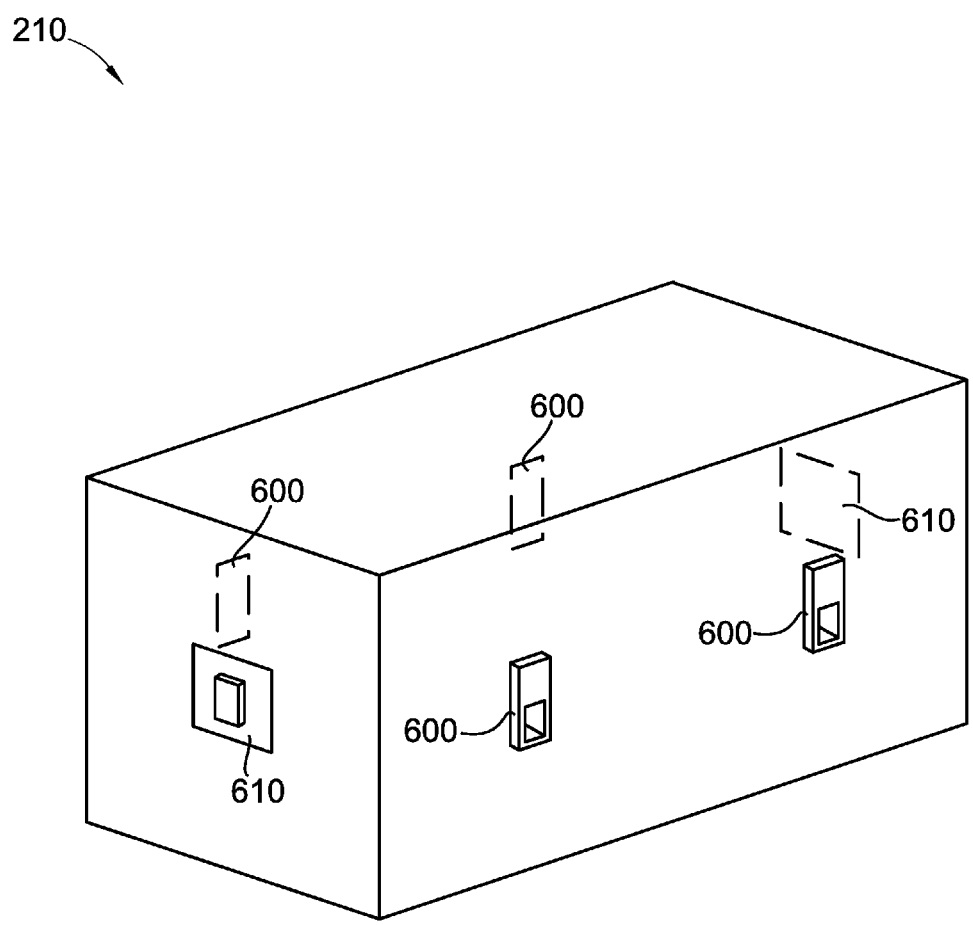
FIG. 6 depicts one embodiment of a positionable object.

FIG. 6 depicts one embodiment of a positionable object 210. The method for repositioning object in an automated storage and retrieval system comprises arranging one or more positionable objects 210 planarly within the frame 205. The one or more positionable objects 210 are removably attached to the one or more connectors 220. In a preferred embodiment, the one or more positionable objects 210 comprise a rectangular prismatic configuration. However, an infinite number of configurations are possible. In a preferred embodiment, the one or more positionable objects 210 measure approximately twelve inches tall, twelve inches deep, and twenty inches wide. These measurements are significant in that they are large enough to fit almost any general kitchen appliance. In one embodiment, the one or more positionable objects 210 comprise a lightweight metal, such as aluminum, magnesium, titanium, beryllium alloys, or combinations thereof. In another embodiment, the one or more positionable objects 210 comprise plastic. Because the one or more positionable objects 210 are removably attached to one or more connectors 220 on the walls 200 of the frame 205 and are, therefore, suspended in air rather than stacked on top of each other as in prior art, the one or more positionable objects 210 do not have the same structural requirements that they would if they had to bear the weight of other positionable objects 210. Therefore, the one or more positionable objects 210 can comprise lighter, thinner, and more economical materials, which saves overall manufacturing costs. They can also be placed closer together, which further optimizes space. In one embodiment, the one or more positionable objects 210 comprise storage bins. In one embodiment, the storage bins are open at the top. In another embodiment, the storage bins are open on a side. In another embodiment, the one or more positionable objects 210 comprise appliances selected from the group consisting of microwaves, refrigerators, ice machines, heaters, toasters, mixers, ovens, juicers, dryers, grinders, dispensers, freezers, gas and electric cook tops, gas and electric ranges, bread machines, humidifiers, and grills. Such appliances can be inserted directly into the automated storage and retrieval system without being placed into a storage bin. In a preferred embodiment, each positionable object 210 comprises one or more connection points 600 where the one or more connectors 220 can attach. In a preferred embodiment, the one or more connection points 600 comprise indentations in the shape of a hook, such that a hook can be inserted and catch. In other embodiments, the one or more connection points 600 comprise magnets, Velcro, adhesives, or solenoids. It is important that the one or more connection points 600 and the one or more connectors 220 be able to connect loosely, such that the connection can be created easily and also removed easily. In a preferred embodiment, each positionable object 210 comprises two connection points 600 on two opposite sides of the positionable object 210. In a preferred embodiment, each positionable object 210 further comprises one or more keys 610. A key is a protruding element that can mate with the one or more planar motion mechanisms 230, such that the one or more planar motion mechanisms 230 can attach to, lift, and move the one or more positionable objects 210. In one embodiment, the key 610 mates with the one or more end effectors 500 attached to the one or more planar motion mechanisms 230. In a preferred embodiment, the one or more keys 610 are positioned on two opposite sides of the one or more positionable objects 210, the two opposite sides being perpendicular to sides that comprise one or more connection points 600. In other embodiments, the one or more keys 610 comprise magnets or other connectors.

Figure 7A:
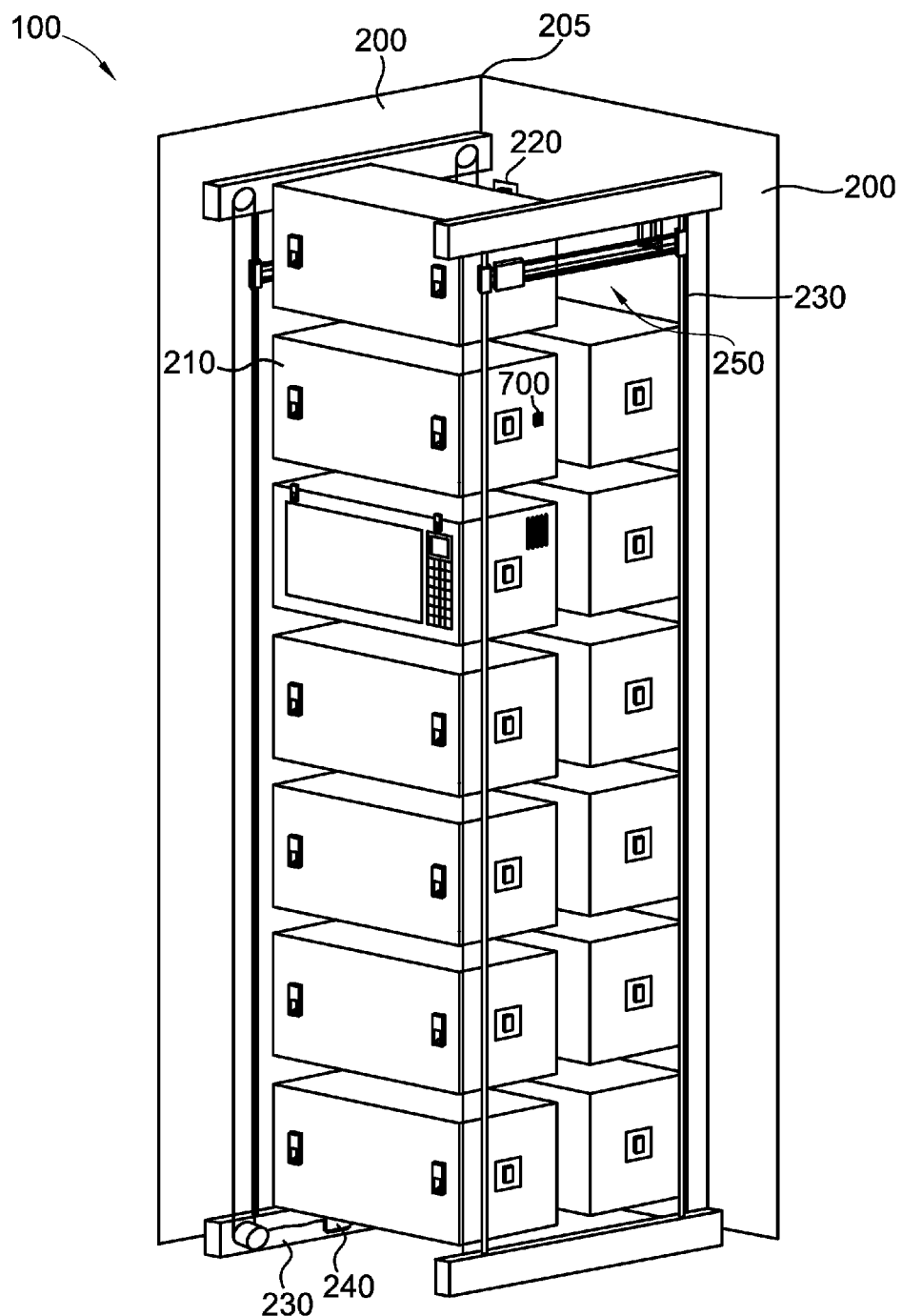
FIG. 7A depicts one embodiment of one or more positionable objects arranged in two columns within the frame.
Figure 7B:
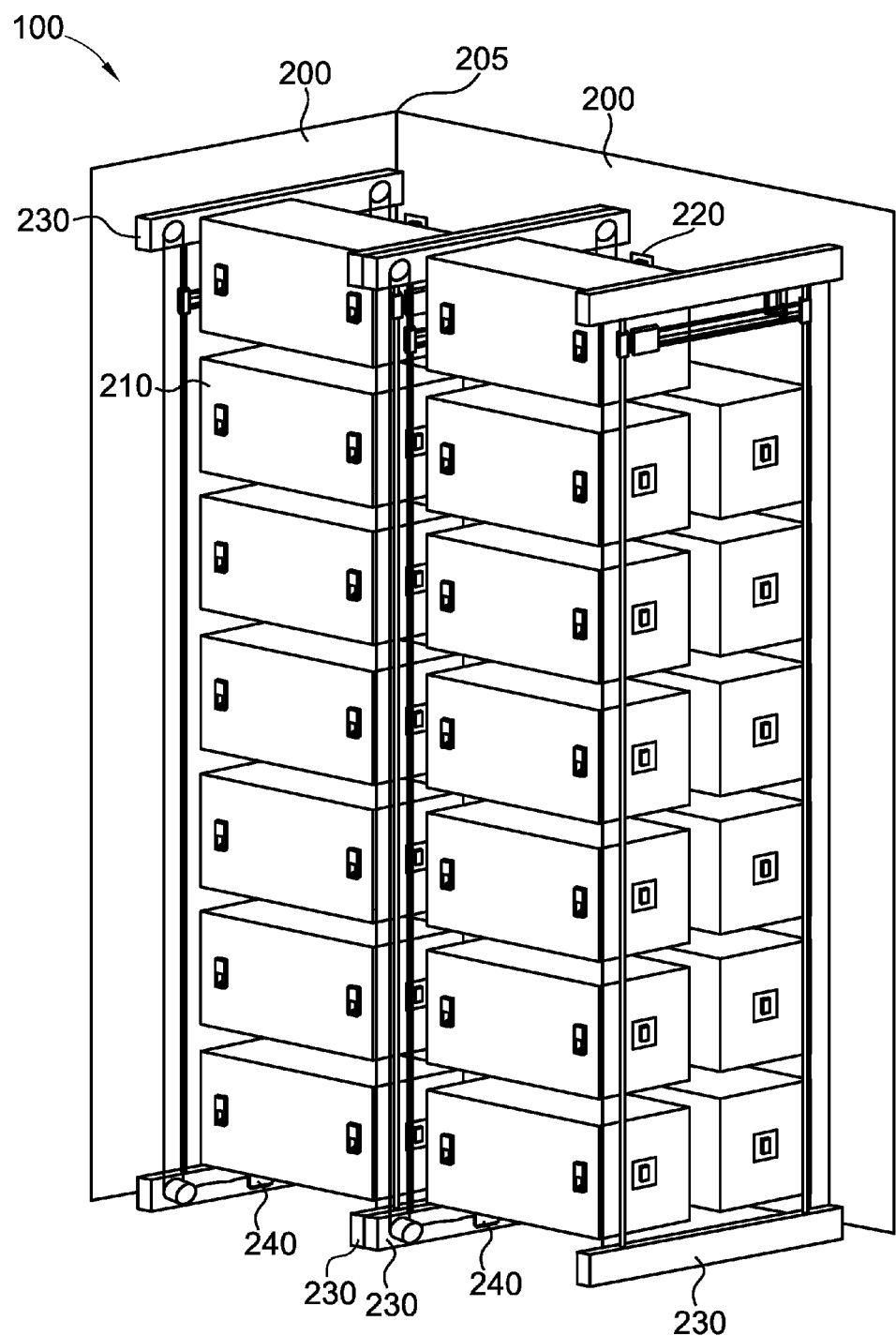
FIG. 7B depicts one embodiment of one or more positionable objects arranged in four columns within the frame.

FIG. 7A and FIG. 7B depict one or more positionable objects 210 arranged within the frame 205. The one or more positionable objects are removably attached to one or more connectors 220 that are mounted to the one or more walls 200 of the frame 205 (two walls are not depicted such that the interior can be seen). One or more planar motion mechanisms are movably mounted to the frame 205 adjacent to the one or more positionable objects 210. The one or more positionable objects 210 maintain this position—removably attached to the one or more connectors 220—when resting. Because each positionable object 210 is hanging from the one or more walls 200, the one or more positionable objects 210 do not rest on top of each other as in prior art automated storage and retrieval systems. For this reason, the one or more positionable objects 210 do not have structural requirements, so they can comprise lighter, thinner, and more economical materials, which saves overall manufacturing costs. The one or more positionable objects 210 can also be placed closer together, which further optimizes space. In one embodiment, a space between the one or more positionable objects 210 on each side measures approximately one-half inch. This measurement of space is just enough to allow a selected one of the one or more positionable objects 210 to be lifted and suspended from the one or more connectors 220 by means of the one or more planar motion mechanisms 230 to reposition the selected one of the one or more positionable objects 210 within the frame 205. The one or more positionable objects 210 can be repositioned in a non-revolving sequence because they are not stacked but each moves one at a time. In one embodiment, the automated storage and retrieval system 100 designed according to the invented method comprises thirteen of the one or more positionable objects 210. Other embodiments comprise twenty-three, twenty-six, or forty-six of the one or more positionable objects 210. However, the automated storage and retrieval system 100 is capable of comprising any number of the one or more positionable objects 210. The number of positionable objects 210 in each column is limited only by space available and the size of the frame 205. The one or more positionable objects 210 are aligned in straight vertical and horizontal lines.

In one embodiment, the one or more positionable objects 210 are arranged in two columns within the frame 205. FIG. 7A depicts this embodiment. FIG. 7A also depicts one positionable object 210 comprising an appliance selected from the group consisting of microwaves, refrigerators, ice machines, heaters, toasters, mixers, ovens, juicers, dryers, grinders, dispensers, freezers, gas and electric cook tops, gas and electric ranges, bread machines, humidifiers, and grills—in this case a microwave. In another embodiment, the one or more positionable objects 210 are arranged in four columns within the frame 205. FIG. 7B depicts this embodiment. At least one of the one or more planar motion mechanisms 230 must be mounted adjacent to each set of two columns of the one or more positionable objects 210. In other embodiments, the one or more positionable objects 210 are arranged in more than four columns within the frame 205. In these embodiments, additional planar motion mechanisms 230 are needed. The automated storage and retrieval system designed according to the invented method also comprises at least one vacant space 250 the size of one positionable object 210. The at least one vacant space 250 makes it possible to move one positionable object 210 either horizontal or vertically. Some embodiments comprise more than one vacant space 250 the size of one positionable object 210. Because the one or more positionable objects 210 are moved one at a time, any number of vacant spaces 250 are possible, and the system can still function, unlike in prior art automated storage and retrieval systems. The one or more positionable objects 210 can be added or taken away to create more or less vacant spaces 250. In a preferred embodiment, space within the frame 205 is divided into one or more columns of positions, each position comprising one positionable object 210 or one vacant space 250. In one embodiment, each position comprises an identifying indicium. In one embodiment, each positionable object 210 also comprises an identifying indicium. In a preferred embodiment, the microcontroller 240 stores a location of each of the one or more positionable objects 210 and each vacant space 250 in non-volatile memory according to the identifying indicia. In another embodiment, the identifying indicium of each positionable object 210 is a machine reader indicium 700, such as a bar code or radio-frequency identification (RFID) tag. In this embodiment, a machine reader on the one or more planar motion mechanisms 230 identifies the location of each of the one or more positionable objects 210 by reading the machine reader indicia 700 on the one or more positionable objects 210.

Figure 8:
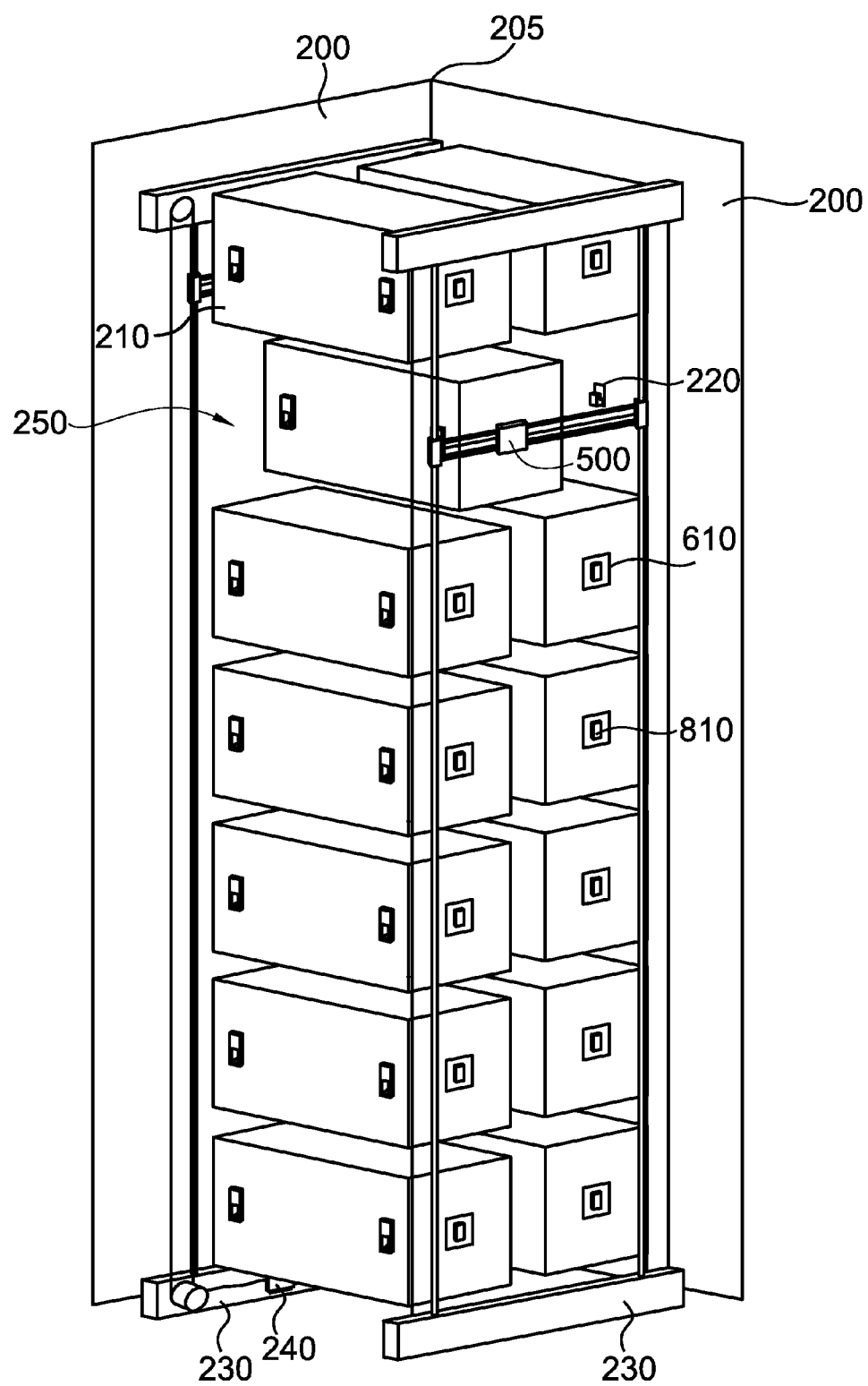
FIG. 8 depicts one embodiment of one of the one or more positionable objects being suspended from the one or more connectors by means of the one or more planar motion mechanisms to reposition the selected one of the one or more positionable objects within the frame.

FIG. 8 depicts one embodiment of one of the one or more positionable objects 210 being suspended from the one or more connectors 220 by means of the one or more planar motion mechanisms 230 to reposition the selected one of the one or more positionable objects 210 within the frame 205. Before suspension and reposition, the one or more positionable objects 210 are removably attached to the one or more connectors 220, which are mounted to the one or more walls 200. In one embodiment, when the microcontroller 240 sends instructions to the one or more planar motion mechanisms 230, the end effector 500 of each planar motion mechanism 230 moves to a specified location in preparation to lift a selected one of the one or more positionable objects 210. In embodiments comprising more than one planar motion mechanism 230, each planar motion mechanism's movement mirrors the planar motion mechanism 230 positioned opposite to it. In one embodiment, each end effector 500 attaches to a key 610 positioned on one of two opposite sides of the one or more positionable objects 210. The end effector 500 then lifts and suspends a selected one of the one or more positionable objects 210 from the one or more connectors 220 and repositions the selected one of the one or more positionable objects 210 within the frame 205 by moving it to a vacant space 250. The one or more positionable objects 210 are reattached to the connectors 220 mounted to the one or more walls 200 after being repositioned. The one or more planar motion mechanisms 230 then continue carrying out then next movement instructions. FIG. 10 depicts a selected one of the one or more positionable objects 210 approximately halfway toward being repositioned into a vacant space 250.

Figure 9:
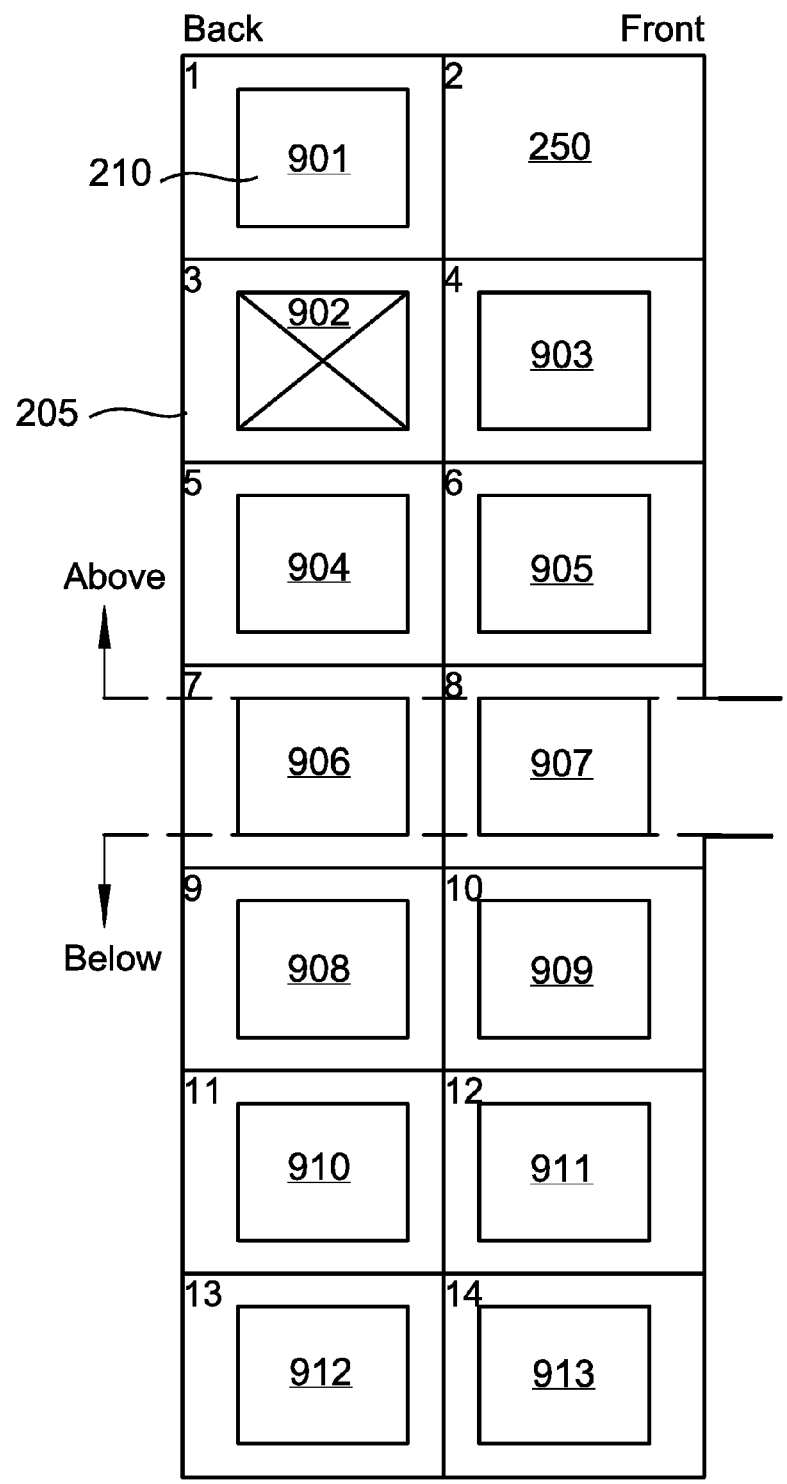
FIG. 9 depicts a two-dimensional view of one embodiment of the one or more positionable objects arranged in two columns within the frame.

FIG. 9 depicts a two-dimensional view of the one or more positionable objects 210 arranged in two columns within the frame 205. In one embodiment, space within the frame 205 is divided into one or more columns of positions. FIG. 9 depicts two columns of positions. In one embodiment, each position has an identifying indicium. In FIG. 9, each position is identified, beginning with the top left position and ending with the bottom right position, by a consecutive numeral 1-14. In one embodiment, each position comprises one positionable object 210 or one vacant space 250. In one embodiment, each positionable object 210 has an identifying indicium. In FIG. 9, each positionable object 210 is identified by a consecutive numeral 901-913. In one embodiment, the positionable object indicia and the position indicia are used to store a location of each of the one or more positionable objects 210 and each vacant space 250 in non-volatile memory. In another embodiment, the identifying indicium for each positionable object 210 is a machine reader indicium 700, such as a bar code or radio-frequency identification (RFID) tag, and the location of each positionable object 210 and vacant space 250 is determined by a machine reader on the one or more planar motion mechanisms 230. In one embodiment, a user assigns customizable identifying indicia to the one or more positionable objects 210 via a user interface. For example, if a user places a blender inside the positionable object with the identifying indicium 901, a user may customize the identifying indicium, identifying the positionable object as "blender" rather than as "901." The invented method for repositioning objects in an automated storage and retrieval system comprises designating a target positionable object. In FIG. 9, the positionable object with the identifying indicium 902 has been designated as the target positionable object. In one embodiment, a user designates the target positionable object via a user interface. The invented method comprises repositioning the one or more positionable objects 210 in a sequence of moves comprising at least one vacant space 250, such that the target positionable object moves directly to a target access position. In FIG. 9, the position with the identifying indicium 2 comprises a vacant space. The position with the identifying indicium 8 is the target access position. In one embodiment, a user designates a location of the target access position via the user interface. In one embodiment, the target positionable object moves horizontally or vertically up if located below the target access position, and the target positionable object moves horizontally or vertically down if located above the target access position, as depicted in FIG. 9.

FIG. 10 depicts instructions that the microcontroller 240 uses to instruct the one or more planar motion mechanisms 230 to reposition the one or more positionable objects 210 in a sequence of moves comprising at least one vacant space 250, such that the target positionable object moves directly to a target access position. Moving directly means moving in the fewest possible number of moves and across the shortest path. In one embodiment, the microcontroller 240 first receives two inputs, 1000 and 1010. Input 1000 is the target positionable object. In one embodiment, the target positionable object is identified by an identifying indicium. In one embodiment, a user can assign customizable identifying indicia to the one or more positionable objects 210 via a user interface. In one embodiment, the microcontroller 240 determines the current location of the target positionable object from memory or, in another embodiment, from inputs from machine reader indicia, such as bar codes or radio-frequency identification (RFID) tags. Input 1010 is the target access position. In one embodiment, the target access position is also identified by an identifying indicium. In one embodiment, a user can designate the target positionable object and/or a location of the target access position via a user interface. Referencing FIG. 10, following receiving the two inputs 1000 and 1010, the microcontroller 240 performs calculations represented by high-level box 1020 to plan a sequence of moves comprising at least one vacant space 250 such that the target positionable object moves directly to the target access position. First, the microcontroller 240 determines whether the target positionable object is located in the same column where the target access position is located (the front column). If yes, then the microcontroller 240 proceeds to the next function. If no, the first task is to move the target positionable object to the front column. In that case, the microcontroller 240 determines whether there is a vacant space in the front column horizontally adjacent to the target positionable object. If yes, the target positionable object can be moved to the front column and the microcontroller 240 proceeds to the next function. If no, then the horizontally adjacent positionable object becomes the "positionable object to move." The microcontroller 240 then determines whether there is a vacant space adjacent to the "positionable object to move"—first below, then behind, then diagonally, then above. If yes, then the "positionable object to move" can move into the adjacent vacant space, which frees the target positionable object to move to space vacated by the "positionable object to move," so that now the target positionable object is in the front column and the microcontroller 240 can proceed to the next function. If no, then the microcontroller 240 determines the nearest vacant space and performs a series of moves such that the "positionable object to move" can move into a vacant space, freeing the target positionable object to move to the front column so the microcontroller 240 can proceed to the next function. When the target positionable object is located in the front column, the next function is to determine whether there is a vacant space directly above the target positionable object if the target positionable object is located below the target access position, or whether there is a vacant space directly below the target positionable object if the target positionable object is located above the target access position. If yes, then the target positionable object moves into the vacant space and proceeds to a swirl function 1030 or 1040. On the other hand, if there was no vacant space directly above or below the target positionable object, then the positionable object directly above or directly below becomes the "positionable object to move." Again, the microcontroller 240 looks for a vacant space adjacent to the "positionable object to move," or finds the nearest vacant space and performs a series of moves to move the "positionable object to move" into a vacant space, thus freeing the target positionable object to move into the space vacated by the "positionable object to move." Then the microcontroller 240 proceeds to the swirl function 1030 or 1040. A swirl function is a set of moves that runs automatically because the moves are the same every time. There are two swirl functions—a clockwise swirl function 1030 and a counterclockwise swirl function 1040. A clockwise swirl function 1030 is performed when the target positionable object is located above the target access position, and a position directly above the target positionable object is a vacant space. A counterclockwise swirl function 1040 is performed if the target positionable object is located below the target access position, and a position directly below the target positionable object is a vacant space. In a clockwise swirl function 1030, a positionable object located diagonally above and behind the target positionable object moves horizontally to the position above the target positionable object. Then the positionable object behind the target positionable object moves up. The positionable object below that also moves up. Then the positionable object below the target positionable object moves to the back row. This leaves a vacant space below the target positionable object. The target positionable object moves into the vacant space. The process repeats until the target positionable object reaches the target access position. The process is identical but opposite for the counterclockwise swirl function.

Each time the microcontroller 240 determines according to the calculations within high-level box 1020 that a positionable object needs to move to a new position—a high-level command 1050—the high-level command 1050 (which is information for just one move) is transferred to mid-level box 1070. Within mid-level box 1070, the microcontroller 240 plans a sequence of love-level commands that the one or more end effectors 500 of the one or more planar motion mechanisms 230 will need to make to perform the high-level command 1050. For each low-level move that the one or more end effectors 500 of the one or more planar motion mechanisms 230 need to make, there are two inputs: the target position 1080 and the current position 1090. The microcontroller 240 computes the error 1092 between the two inputs, and in box 1094 calculates the vector at which the one or more end effectors 500 of the one or more planar motion mechanisms 230 need to move to eliminate the error. A motor 590 then moves the one or more end effectors 500 of the one or more planar motion mechanisms 230 to the location that eliminates the error. Finally, in box 1096, the microcontroller 240 updates the state of the one or more end effectors 500 of the one or more planar motion mechanisms 230 following the move. The process is repeated until the one or more end effectors 500 of the one or more planar motion mechanisms 230 have completed the sequence of low-level commands necessary to perform the high-level command 1050 of moving one positionable object 210. Then in box 1060, the locations of the one or more positionable objects 210 are updated. Following the update in box 1060, the calculations in high-level box 1020 start over again, until another high-level command 1050 is generated. The process continues until the target positionable object has reached the target access position.

Figure 11A:
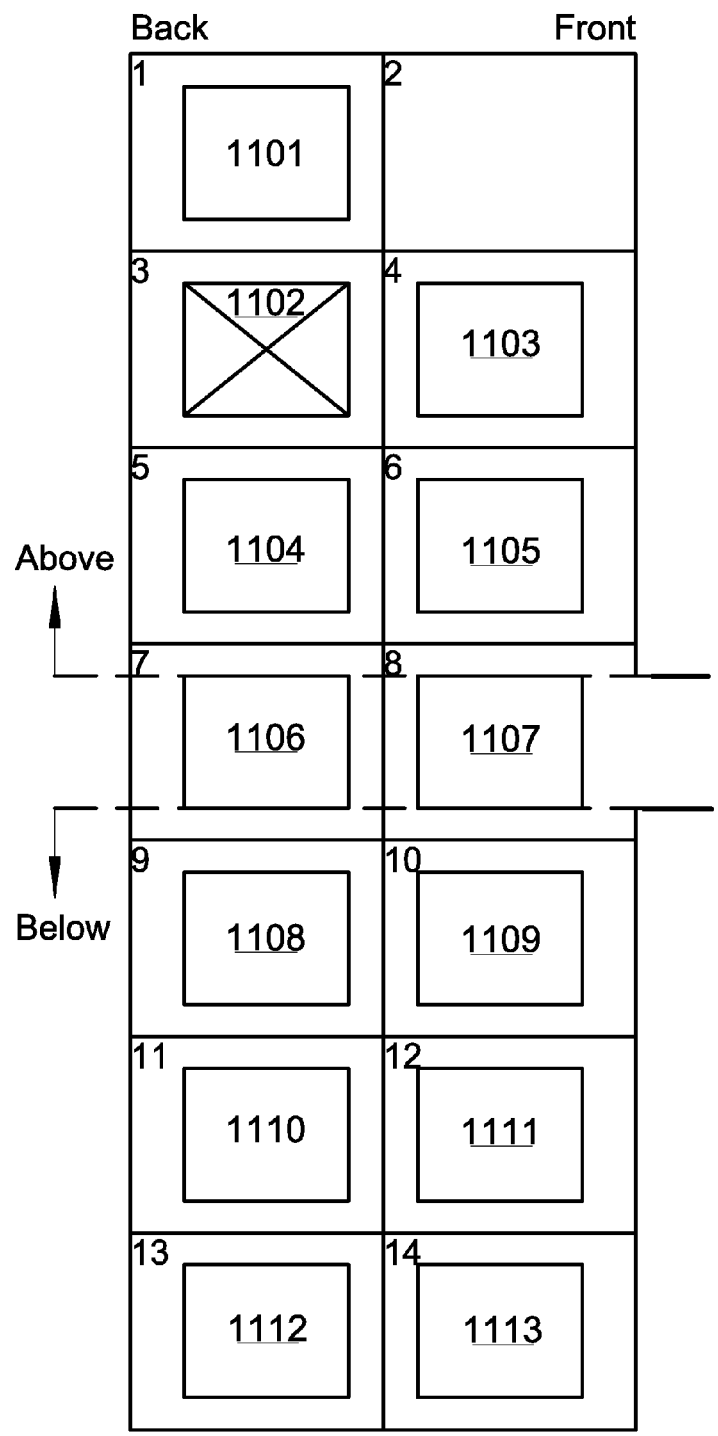
FIG. 11A depicts a first stage of one embodiment of one or more planar motion mechanisms repositioning the one or more positionable objects in a sequence of moves comprising at least one vacant space, such that a target positionable object moves directly to a target access position.
Figure 11B:
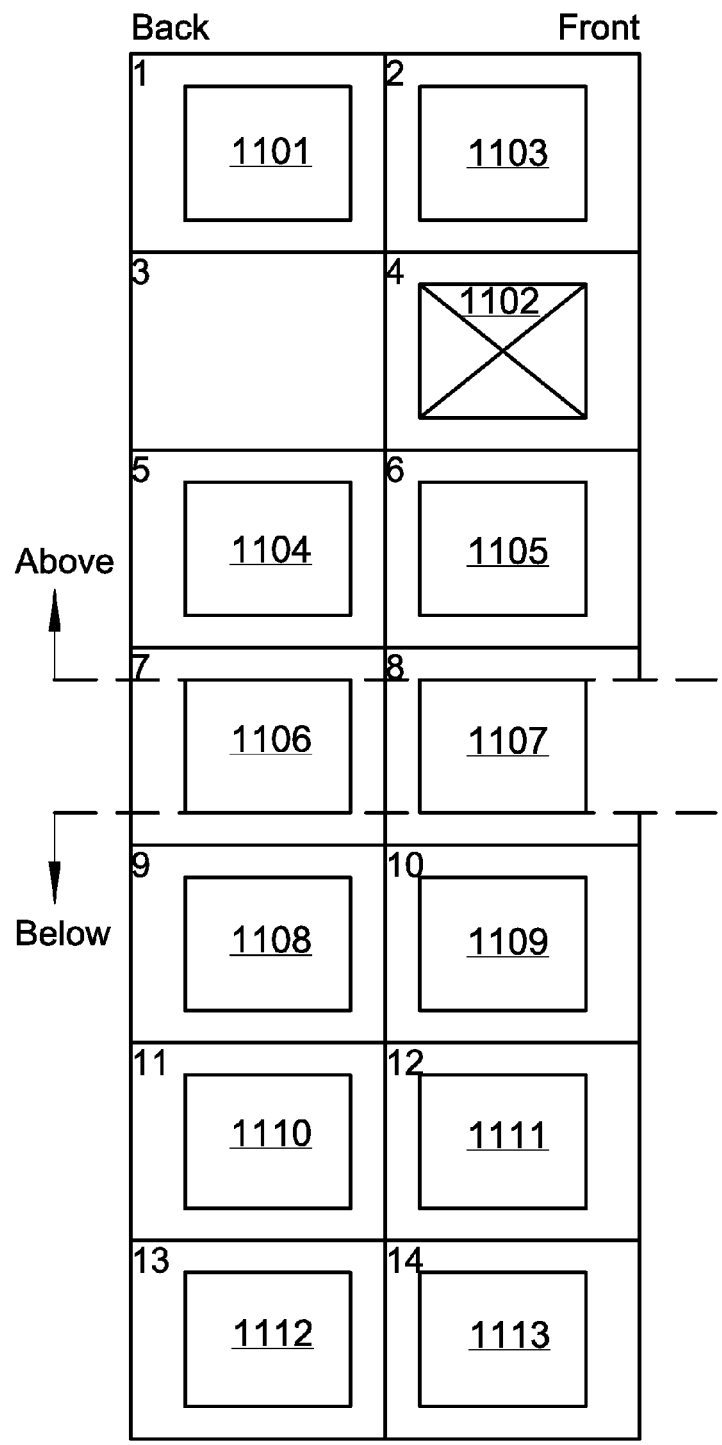
FIG. 11B depicts a second stage of one embodiment of one or more planar motion mechanisms repositioning the one or more positionable objects in a sequence of moves comprising at least one vacant space, such that a target positionable object moves directly to a target access position.
Figure 11C:
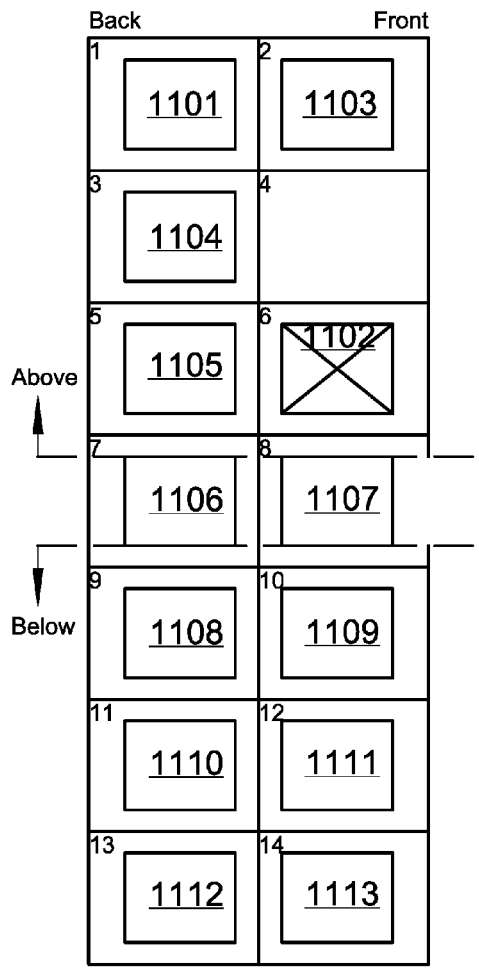
FIG. 11C depicts a third stage of one embodiment of one or more planar motion mechanisms repositioning the one or more positionable objects in a sequence of moves comprising at least one vacant space, such that a target positionable object moves directly to a target access position.
Figure 11D:
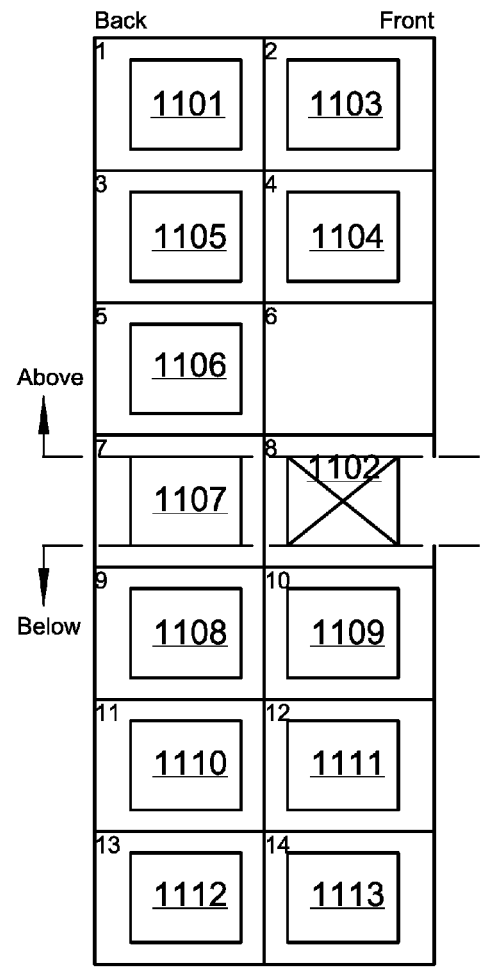
FIG. 11D depicts a fourth stage of one embodiment of one or more planar motion mechanisms repositioning the one or more positionable objects in a sequence of moves comprising at least one vacant space, such that a target positionable object moves directly to a target access position.

FIG. 11A-11D depict an example of the one or more planar motion mechanisms 230 repositioning the one or more positionable objects 210 in a sequence of moves comprising at least one vacant space 250, such that a target positionable object moves directly to a target access position. FIG. 11A depicts an automated storage system in which the positionable object 210 with the identifying indicium 1102 is the target positionable object and the target access position is the position with the identifying indicium 8. Because the positionable object 210 with the identifying indicium 1102 in not in the front column, the first task is to move it to the front column. Because position 4 horizontally adjacent in the front column is not a vacant space, the positionable object in position 4, the positionable object with the identifying indicium 1103, becomes the "positionable object to move." Because there is a vacant space in position 2 above the "positionable object to move," the "positionable object to move" can move up into the vacant space in position 2. The target positionable object with identifying indicium 1102 can then move into position 4 in the front column as depicted in FIG. 11B. Because position 6 below the target positionable object with identifying indicium 1102 is not vacant, the positionable object with the identifying indicium 1105 in position 6 becomes the "positionable object to move." Because position 3 diagonally above and behind the "positionable object to move" is vacant, the positionable object with identifying indicium 1104 can move up into the vacant space in position 3, and the "positionable object to move" (the positionable object with identifying indicium 1105) can then move backward into position 5. The target positionable object with identifying indicium 1102 can then move down into position 6, as depicted in FIG. 11C. Because position 4 above the target positionable object with identifying indicium 1102 is now vacant, the clockwise swirl function 1030 will begin. In the swirl function 1030, the positionable object located diagonally above and behind the target positionable object with identifying indicium 1102, in this case the positionable object with identifying indicium 1104, moves horizontally to the position above the target positionable object with identifying indicium 1102. Then the positionable object behind the target positionable object with identifying indicium 1102, in this case the positionable object with identifying indicium 1105, moves up. The positionable object below that, the positionable object with identifying indicium 1106, also moves up. Then the positionable object below the target positionable object with identifying indicium 1102, in this case the positionable object with identifying indicium 1107, moves to the back row. This leaves a vacant space below the target positionable object with identifying indicium 1102. The target positionable object with identifying indicium 1102 moves into the vacant space, as depicted in FIG. 11D. In this case, the vacant space is the target access position, position 8, so the function is complete.

Figure 12:
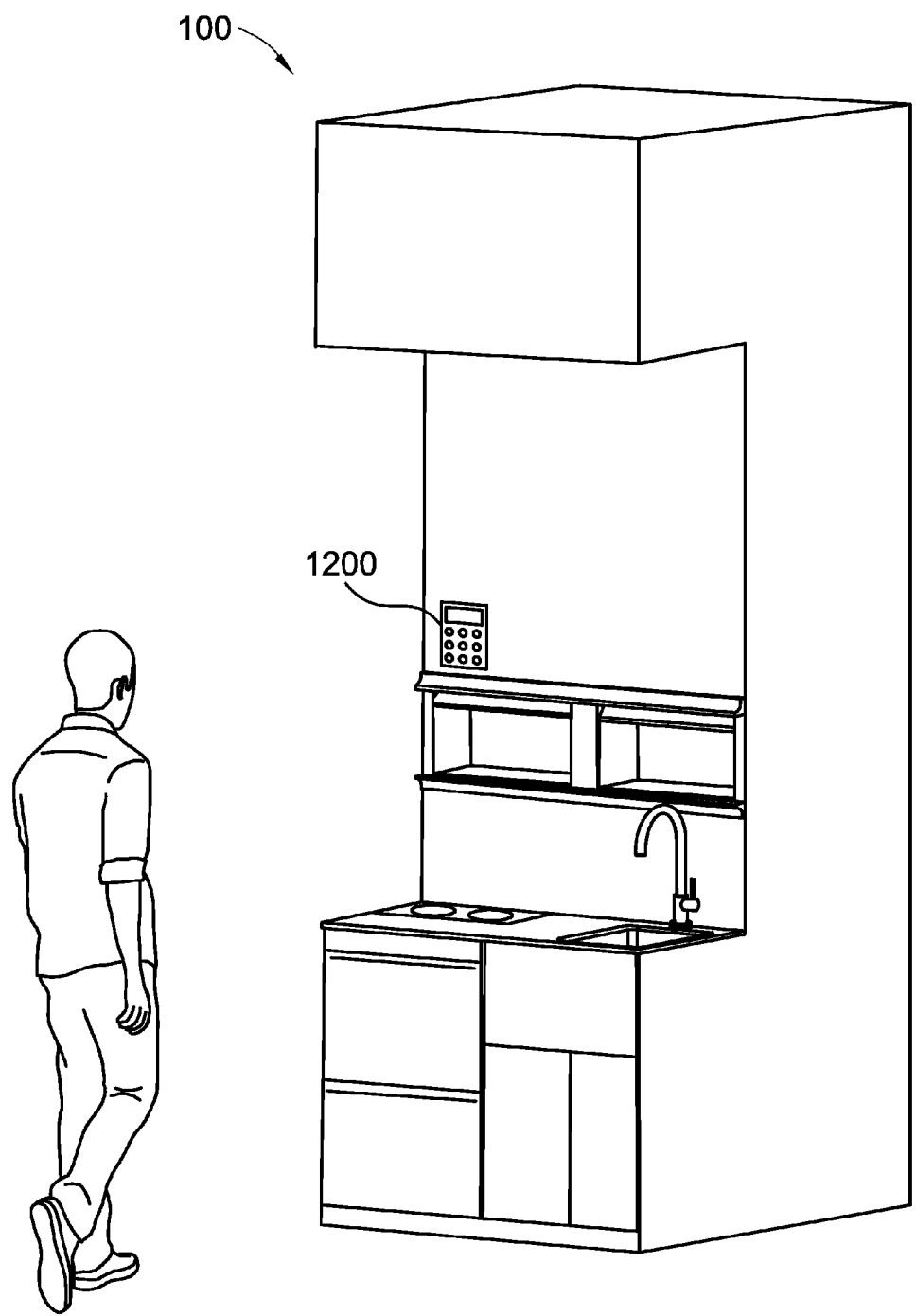
FIG. 12 depicts one embodiment of an automated storage and retrieval system designed according to the invented method for repositioning objects in an automated storage and retrieval system comprising a user interface.

FIG. 12 depicts one embodiment of an automated storage and retrieval system 100 designed according to the invented method for repositioning objects in an automated storage and retrieval system comprising a user interface 1200. In a preferred embodiment, the user interface 1200 comprises a voice control user interface. In other embodiments, the user interface 1200 comprises buttons or a touch-sensitive display on a mobile device. In one embodiment, a user assigns customizable identifying indicia to the one or more positionable objects 210 via the user interface 1200. In one embodiment, the user designates a target positionable object via the user interface 1200. In one embodiment, the user designates a location of the target access position via the user interface. In one embodiment, the user interface 1200 comprises a timer. The timer alerts the user when the target positionable object arrives at an access port 300. In one embodiment, the user assigns codes to the one or more positionable objects 210 relative to the degree of use via the user interface 1200.

The invention claimed is:

1. A method for repositioning objects in an automated storage and retrieval system comprising:
   arranging one or more positionable objects planarly within a frame, the frame comprising one or more walls;
   removably attaching the one or more positionable objects to one or more connectors that are mounted to the one or more walls;
   movably mounting one or more planar motion mechanisms to the frame adjacent to the one or more positionable objects;
   suspending the one or more positionable objects from the one or more connectors by means of the one or more planar motion mechanisms to reposition the one or more positionable objects within the frame;
   designating a target positionable object; and
   providing a microcontroller that instructs the one or more planar motion mechanisms to reposition the one or more positionable objects in a sequence of moves comprising at least one vacant space, such that the target positionable object moves directly to a target access position.

2. The method for repositioning objects in an automated storage and retrieval system of claim 1, wherein space within the frame is divided into one or more columns of positions, each position comprising one positionable object or one vacant space.

3. The method for repositioning objects in an automated storage and retrieval system of claim 2, wherein each position has an identifying indicium.

4. The method for repositioning objects in an automated storage and retrieval system of claim 1, wherein the target positionable object moves horizontally or vertically up if located below the target access position, and the target positionable object moves horizontally or vertically down if located above the target access position.

5. The method for repositioning objects in an automated storage and retrieval system of claim 1, wherein each positionable object has an identifying indicium.

6. The method for repositioning objects in an automated storage and retrieval system of claim 5, wherein the identifying indicium is a machine reader indicium, such as a bar code or radio-frequency identification (RFID) tag.

7. The method for repositioning objects in an automated storage and retrieval system of claim 1, wherein the microcontroller stores a location of each of the one or more positionable objects and each vacant space in non-volatile memory.

8. The method for repositioning objects in an automated storage and retrieval system of claim 1, wherein the one or more planar motion mechanisms comprise H-bots.

9. The method for repositioning objects in an automated storage and retrieval system of claim 1, wherein the one or more positionable objects comprise storage bins.

10. The method for repositioning objects in an automated storage and retrieval system of claim 1, wherein the one or more positionable objects comprise appliances selected from the group consisting of microwaves, refrigerators, ice machines, heaters, toasters, mixers, ovens, juicers, dryers, grinders, dispensers, freezers, gas and electric cook tops, gas and electric ranges, bread machines, humidifiers, and grills.

11. The method for repositioning objects in an automated storage and retrieval system of claim 1, wherein the one or more connectors comprise hooks.

12. The method for repositioning objects in an automated storage and retrieval system of claim 1, wherein the connectors comprise electrical conductors.

13. The method for repositioning objects in an automated storage and retrieval system of claim 1, wherein the frame further comprises one or more access ports, each access port comprising a window that provides access to only one of the one or more positionable objects.

14. The method for repositioning objects in an automated storage and retrieval system of claim 1, further comprising a user interface.

15. The method for repositioning objects in an automated storage and retrieval system of claim 14, the user interface comprising a voice control user interface.

16. The method for repositioning objects in an automated storage and retrieval system of claim 14, wherein a user assigns customizable identifying indicia to the one or more positionable objects via the user interface.

17. The method for repositioning objects in an automated storage and retrieval system of claim 14, wherein a user designates a location of the target access position via the user interface.

18. The method for repositioning objects in an automated storage and retrieval system of claim 14, wherein a user designates the target positionable object via the user interface.

19. The method for repositioning objects in an automated storage and retrieval system of claim 1, the one or more planar motion mechanisms comprising one or more end effectors, the one or more end effectors removably attaching to the one or more positionable objects, and the microcontroller directing movement of the one or more end effectors.

20. The method for repositioning objects in an automated storage and retrieval system of claim 1, wherein a space between the one or more positionable objects 210 on each side measures approximately one-half inch.

* * * * *